July 20, 1937.  T. W. WEISEMANN  2,087,365
ANTIFRICTION CUSHIONED WHEEL
Filed Sept. 7, 1934
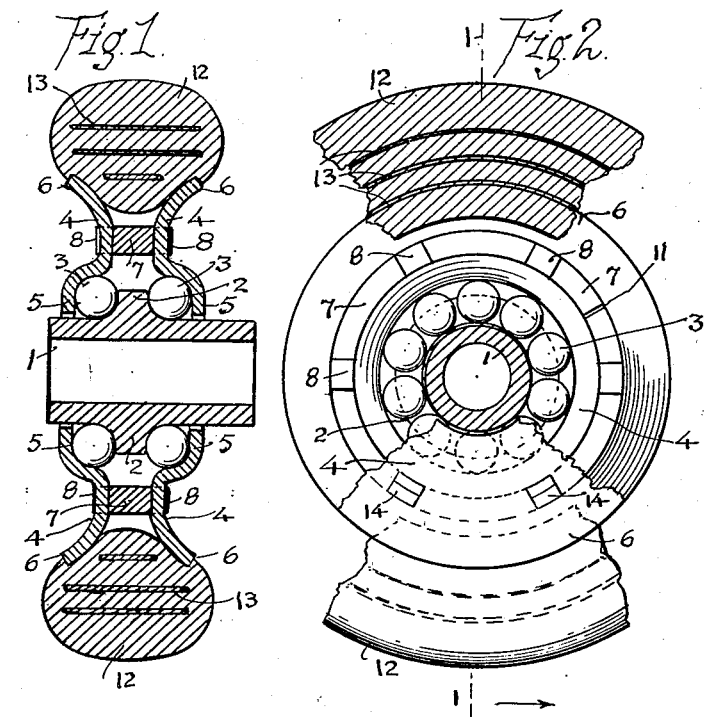
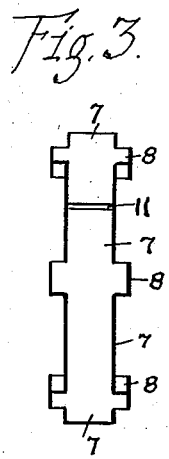
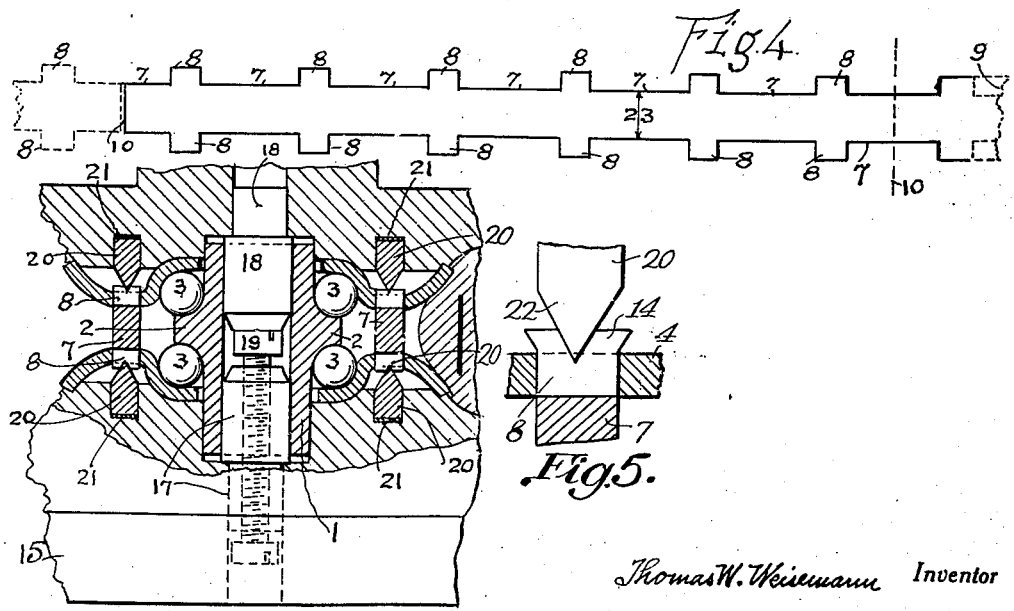
Thomas W. Weisemann Inventor
By  *N. S. Amitutz*  Attorney Patented July 20, 1937

2,087,365

UNITED STATES PATENT OFFICE 2,087,365

ANTIFRICTION CUSHIONED WHEEL

Thomas W. Weisemann, Chesterton, Ind.

Application September 7, 1934, Serial No. 743,131

5 Claims. (Cl. 208—181)

My invention relates to improvements in anti-friction-cushioned wheels and it more especially consists of the features pointed out in the claims.

The purpose of my invention is to provide an anti-friction wheel, that may or may not be associated with a cushioned tread; and that provides for simplicity of construction, ease and accuracy of assemblage and the completion of an entire article with the least number of operations. A further purpose is to adapt my wheels in pairs or singly for roller skates or any other utilitarian purpose.

With these and other ends in view I illustrate in the accompanying drawing such instances of adaptation as will illustrate the broad underlying features of the invention without limiting myself to the specific details shown thereon and described herein.

Fig. 1 is an elevation in section of line 1 of Fig. 2.

Fig. 2 is a side elevation partly in section with portions of the tire broken away.

Fig. 3 is an elevation of a spacing ring.

Fig. 4 is a developed view of the ring shown in Fig. 3, in its original flattened shape before being rolled into the required diameter to form the separating ring which holds the side disks at a predetermined distance apart.

Fig. 5 is an enlarged diagrammatic view showing how the parts are retained in an assembled relation to each other.

The stationary wheel hub 1 may be formed with an annular flange 2 which serves as one half of each of two separate ball races. It may be curved or beveled as desired. Balls 3 are positioned between the flange 2 and the ball race portion 5 of the side disks 4. These side disks flare outward at 6 to receive the rubber tire 12. The hub 1 and the ball races 5 of the disks 4 are hardened.

In order that the side disks 4 will be maintained at a definite and exact distance apart when the wheel is completed, a separating ring 7 is placed therebetween. This ring has side projections 8 which pass into corresponding openings formed in the disks 4.

In order to hold the side disks 4 assembled on the separating ring 7 the ends of the projections 8 are slightly spread or upset as shown at 14 in Fig. 6. Their outer ends may be slightly rounded. This step in the assemblage of the parts is affected very simply in a single operation. Among different ways for performing this, one way is suggested in Fig. 5. In this a lower die 15 is shaped to approximate the exterior contour of one of the side disks and the tire. It has a centering pin 17 which serves as a guide over which the hub 1 is threaded. An upper die 16 may be similarly shaped. It has a guide pin 18 which centers the other end of the hub 1. Hardened rings 20 may be positioned in the lower die 15 and in the upper die 16. A limit screw 19 between the guide pins 17 and 18, threaded in the guide pin 17, may serve to limit the movement of the dies 15 and 16 toward each other. Dimensioning shims 21 may be placed beneath the flat portion of the hardened rings 20. The other edge of the rings 20 are V-shaped at 22. If desired the dies 15 and 16 at their outer rims may engage each other, if desired, as a substitute for the limit screw 19.

The dies 15 and 16 in relation to the guide pins 17 and 18, serve to position the side disks 4 without clamping the balls 3 and due to the thickness of the shims 21 the V-portion 22 of the rings 20 enter the projections 8 just sufficiently to spread the material, as at 14 of Fig. 6, to hold the parts in an assembled relation without interfering with the free movement of the balls 3 within the practical tolerances usual in this class of fabrication.

By using a separating strip 7 formed from a blank 9 I am enabled to hold the width 23 between the projections 8 very exactly and it is on this exactness that the efficiency of my wheel in use and the further efficiency secured through exact and rapid assemblage that I attain results which have hitherto been unobtainable. The blanks 9 may be of any desired length. After being shaped between forming rollers (not shown), or otherwise, the required length needed for the ring 7 may be separated at 10 from the blank 9. After the strip 7 is rolled into the shape of a ring as shown in Fig. 2, the adjacent ends 11 need not be exactly positioned as it is immaterial if they are spaced a greater or less distance apart.

The assemblage of the parts in the dies 15 and 16 may be largely varied but as an instance it may be stated that one of the side disks 4 will be placed on the lower die 15. The hub 1 is then placed over the guide pin 17, leaving sufficient space between the flange 2 and the portion 5 for the insertion of the first group of balls 3 covered with grease, after which the hub 1 may be dropped as far as it will go. Then the tire may be placed and the separating ring 7 positioned with projections 8 passing through corresponding openings in the lower disk 4.

The second group of balls also covered with grease may then be placed on flange 2. The other or upper disk 4 is then placed onto the separating ring 7 so that the projections 8 extend through corresponding openings in it. The upper die 16 with its guide pin 18 is then brought down onto the assembled parts and pressure is applied until the pin 18 meets the adjusting screw 19 during which time the disks 4 will be brought to their respective spaced apart dimensional positions and the rings 20 will at the same time spread the ends of the projection just enough to hold the parts assembled without jamming the balls in their races.

As shown in Fig. 1 and in Fig. 5 the hub 1 projects more at one end than the other. This is the usual practice when a pair of wheels are used as a unit. If a wheel is used singly the hub may project to the same extent at each end. There is an entire absence of rivets etc. which have been used heretofore, thus simplifying the assembling of each wheel.

By reason of the V-portion 22 being annular there is no necessity for exact registration between the part 22 and the projections 8, as there would be if there was a separate V-portion for each one of the projections.

The rubber tire 12 is specially reinforced by horizontal layers of fabric 13. These layers preserve the tire from disintegration and prevent undue flattening when the tires and wheels are used on roller skates. If the reinforcing strips 13 are omitted the tire under the weight of the user will soon become flattened and in a short time useless. In this connection, although having described my wheel and tire as being applicable to roller skate uses, I do not limit myself to this adaptation, because the broad underlying feature of the invention is applicable to any kind of wheel, whether used for one purpose or another.

What I claim is:—

1. An article of manufacture including a separating member adapted to position and hold the sides of an anti-friction wheel in spaced apart relation as they engage balls placed between them and an inner hub, said member having a uniform width, and projections extending from each edge of the member, said projections being in oppositely positioned pairs.

2. An article of manufacture including a separating member adapted to position and hold the sides of an anti-friction wheel in spaced apart relation as they engage balls placed between them and an inner hub, projections extending from each edge of the member, said projections being in oppositely positioned pairs adapted to pass through similarly positioned openings in the sides of the wheel, and spread apart ends of the projections on a line that is approximately concentric to the center of the wheel.

3. An article of manufacture comprising a separating member adapted to position and hold the sides of an anti-friction wheel in spaced apart relation as they engage balls placed between them and an inner hub, said member having an approximately uniform width, and a plurality of projections extending from each edge of the member, said projections being in oppositely positioned pairs on a continuous length blank adapted to be severed to the required dimension and formed to a predetermined diameter.

4. In an anti-friction wheel a separating strip comprising a single member having a uniform width, projections extending out from each edge of the member, a pair of duplicate side disks positioned on and secured to the projections, said disks having openings therethrough, a hub projecting through the openings, and a plurality of balls in separate rows between the hub and the side disks free from contact with the separating strip.

5. In anti-friction wheels, a hub having an opening therethrough, an annular bead on the outside of the hub said bead being at one side of the mid-length, a pair of duplicate sides adapted to enclose an elastic tire therebetween at their outer edges, said sides terminating at their inner edges on each side of the bead, a plurality of balls between such inner edges and the bead, and means comprising a one piece separator positioned between the sides and secured thereto, said separator being adapted to hold the sides rigidly without cramping the ball.

THOMAS W. WEISEMANN.